United States Patent
Gao et al.

(10) Patent No.: US 11,341,957 B2
(45) Date of Patent: May 24, 2022

(54) METHOD FOR DETECTING KEYWORD IN SPEECH SIGNAL, TERMINAL, AND STORAGE MEDIUM

(71) Applicant: TENCENT TECHNOLOGY (SHENZHEN) COMPANY LIMITED, Shenzhen (CN)

(72) Inventors: Yi Gao, Shenzhen (CN); Meng Yu, Shenzhen (CN); Dan Su, Shenzhen (CN); Jie Chen, Shenzhen (CN); Min Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/933,446

(22) Filed: Jul. 20, 2020

(65) Prior Publication Data

US 2020/0357386 A1 Nov. 12, 2020

Related U.S. Application Data

(63) Continuation of application No. PCT/CN2019/080143, filed on Mar. 28, 2019.

(30) Foreign Application Priority Data

May 8, 2018 (CN) .......................... 201810431800.7

(51) Int. Cl.
*G10L 15/08* (2006.01)

(52) U.S. Cl.
CPC ........ *G10L 15/08* (2013.01); *G10L 2015/088* (2013.01)

(58) Field of Classification Search
CPC . G10L 15/08; G10L 2015/081; G10L 15/083; G10L 2015/085; G10L 2015/086;
(Continued)

(56) References Cited

U.S. PATENT DOCUMENTS 6,785,650 B2* 8/2004 Basson .................. G10L 15/22
704/235
9,123,339 B1* 9/2015 Shaw ..................... G10L 15/22
(Continued)

FOREIGN PATENT DOCUMENTS

| CN | 101576901 A | 11/2009 |
| CN | 103500579 A | 1/2014 |

(Continued)

OTHER PUBLICATIONS

T. Nagarajan, H. A. Murthy and N. Hemalatha, "Automatic segmentation and labeling of continuous speech without bootstrapping," 2004 12th European Signal Processing Conference, 2004, pp. 561-564. (Year: 2004).*

(Continued)

*Primary Examiner* — Andrew M Moyer
*Assistant Examiner* — Stephen M Brinich
(74) *Attorney, Agent, or Firm* — Anova Law Group, PLLC (57) ABSTRACT

A method for detecting a keyword, applied to a terminal, includes: extracting a speech eigenvector of a speech signal; obtaining, according to the speech eigenvector, a posterior probability of each target character being a key character in any keyword in an acquisition time period of the speech signal; obtaining confidences of at least two target character combinations according to the posterior probability of each target character; and determining that the speech signal includes the keyword upon determining that all the confidences of the at least two target character combinations meet a preset condition. The target character is a character in the speech signal whose pronunciation matches a pronunciation of the key character. Each target character combination includes at least one target character, and a confidence of a target character combination represents a probability of the (Continued)

target character combination being the keyword or a part of the keyword.

17 Claims, 6 Drawing Sheets

(58) Field of Classification Search
CPC . G10L 2015/088; G10L 15/197; G10L 15/26; G10L 15/183
USPC .......................... 704/251–257, 200, 235, 275
See application file for complete search history.

(56) References Cited

U.S. PATENT DOCUMENTS

| | | | |
|---|---|---|---|
| 9,202,462 | B2 | 12/2015 | Parada San Martin et al. |
| 2004/0220797 | A1 | 11/2004 | Wang et al. |
| 2006/0074664 | A1* | 4/2006 | Lam ..................... G10L 15/142 704/255 |
| 2007/0124147 | A1* | 5/2007 | Gopinath ............... G10L 15/19 704/257 |
| 2010/0145504 | A1* | 6/2010 | Redford ................ B07C 7/005 700/227 |
| 2016/0217790 | A1 | 7/2016 | Sharifi |
| 2017/0148429 | A1* | 5/2017 | Hayakawa .............. G10L 15/02 |
| 2021/0050018 | A1* | 2/2021 | Kim ...................... G10L 15/30 |
| 2021/0056954 | A1* | 2/2021 | Karita .................. G10L 15/063 |

FOREIGN PATENT DOCUMENTS

| | | |
|---|---|---|
| CN | 104978963 A | 10/2015 |
| CN | 105096939 A | 11/2015 |
| CN | 105551485 A | 5/2016 |
| CN | 105702253 A | 6/2016 |
| CN | 106653003 A | 5/2017 |
| CN | 106782536 A | 5/2017 |
| CN | 107230475 A | 10/2017 |
| CN | 107665705 A | 2/2018 |
| CN | 107767861 A | 3/2018 |
| CN | 107871499 A | 4/2018 |
| CN | 108615526 A | 10/2018 |
| EP | 0601778 A1 * | 6/1994 .......... G10L 15/142 |
| WO | 9927525 A1 | 6/1999 |

OTHER PUBLICATIONS

The European Patent Office (EPO) the Extended European Search Report for 19800168.7, dated May 17, 2021 12 Pages (including translation).
The World Intellectual Property Organization (WIPO) International Search Report for PCT/CN2019/080143 dated Jul. 2, 2019 5 Pages (including translation).
The State Intellectual Property Office of the People's Republic of China (SIPO) Office Action 1 for 201810431800.7, dated Feb. 28, 2020 6 Pages (including translation).

* cited by examiner

METHOD FOR DETECTING KEYWORD IN SPEECH SIGNAL, TERMINAL, AND STORAGE MEDIUM

CROSS-REFERENCES TO RELATED APPLICATIONS

This application is a continuation application of PCT Patent Application No. PCT/CN2019/080143, filed on Mar. 28, 2019, which claims priority to Chinese Patent Application No. 201810431800.7, entitled "METHOD AND APPARATUS FOR DETECTING KEYWORD IN SPEECH SIGNAL, TERMINAL, AND STORAGE MEDIUM" and filed with the National Intellectual Property Administration, PRC on May 8, 2018, the entire contents of both of which are incorporated herein by reference.

FIELD OF THE TECHNOLOGY

The present disclosure relates to the field of terminal technologies, and in particular, to a method and an apparatus for detecting a keyword in a speech signal, a terminal, and a storage medium.

BACKGROUND OF THE DISCLOSURE

In modern life, smart devices such as smartphones, smart televisions, smart sounds, and smart switches have been widely applied. Usually, the smart device is provided with a plurality of functions, including acquiring a speech signal, processing the speech signal in real-time or non-real-time, and the like. Based on these functions, the smart device may perform a corresponding operation according to a keyword detected from a speech signal without manual operation of a user. A detection result of the keyword directly affects the accuracy of the operation performed by the smart device. Therefore, how to detect the keyword in the speech signal is the key to improving man-machine interaction experience.

However, in an actual usage scenario, when a speech signal includes a plurality of characters, the speech signal may not include a keyword, but a confidence obtained by accumulating posterior probabilities of the plurality of characters in the speech signal being key characters is greater than a threshold. In this case, it is mistakenly regarded that a keyword is detected from the speech signal, which results in a false detection. For example, if the keyword is "你好小听" (pronounced as ni3 hao3 xiao3 ting1 in Pinyin)", when a speech signal includes characters whose pronunciations match those of any three key characters in "你好小听", a confidence obtained by accumulating posterior probabilities of the three characters being the key characters may be greater than a threshold, which results in a false detection.

SUMMARY

According to embodiments provided in the present disclosure, a method and an apparatus for detecting a keyword in a speech signal, a terminal, and a storage medium are provided. According to one aspect, a method for detecting a keyword in a speech signal is provided for a terminal, the method including: extracting a speech eigenvector of a speech signal; obtaining, according to the speech eigenvector, a posterior probability of each target character being a key character in any keyword in an acquisition time period of the speech signal; obtaining confidences of at least two target character combinations according to the posterior probability of each target character; and determining that the speech signal includes the keyword upon determining that all the confidences of the at least two target character combinations meet a preset condition. The target character is a character in the speech signal whose pronunciation matches a pronunciation of the key character. Each target character combination includes at least one target character, and a confidence of a target character combination represents a probability of the target character combination being the keyword or a part of the keyword.

According to another aspect, a terminal is provided, the terminal including a processor and a memory, the memory storing computer-readable instructions, and the computer-readable instructions, when executed by the processor, causing the processor to perform: extracting a speech eigenvector of a speech signal; obtaining, according to the speech eigenvector, a posterior probability of each target character being a key character in any keyword in an acquisition time period of the speech signal; obtaining confidences of at least two target character combinations according to the posterior probability of each target character; and determining that the speech signal includes the keyword upon determining that all the confidences of the at least two target character combinations meet a preset condition. The target character is a character in the speech signal whose pronunciation matches a pronunciation of the key character. Each target character combination includes at least one target character, and a confidence of a target character combination represents a probability of the target character combination being the keyword or a part of the keyword.

According to another aspect, a non-transitory computer-readable storage medium storing computer-readable instructions is provided, the computer-readable instructions, when executed by one or more processors, causing the one or more processors to perform: extracting a speech eigenvector of a speech signal; obtaining, according to the speech eigenvector, a posterior probability of each target character being a key character in any keyword in an acquisition time period of the speech signal; obtaining confidences of at least two target character combinations according to the posterior probability of each target character; and determining that the speech signal includes the keyword upon determining that all the confidences of the at least two target character combinations meet a preset condition. The target character is a character in the speech signal whose pronunciation matches a pronunciation of the key character. Each target character combination includes at least one target character, and a confidence of a target character combination represents a probability of the target character combination being the keyword or a part of the keyword.

Details of one or more embodiments of the present disclosure are provided in the accompany drawings and descriptions below. Other features, objectives, and advantages of the present disclosure will become apparent from the specification, the accompanying drawings, and the claims.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from the accompanying drawings without creative efforts.

DESCRIPTION OF EMBODIMENTS

To make objectives, technical solutions, and advantages of the present disclosure clearer and more understandable, the present disclosure is further described in detail below with reference to the accompanying drawings and the embodiments. It is to be understood that the specific embodiments described herein are only used for explaining the present disclosure, and are not used for limiting the present disclosure. All other embodiments obtained by a person of ordinary skill in the art based on the embodiments of the present disclosure without creative efforts shall fall within the protection scope of the present disclosure.

With the popularization of smart speech devices, man-machine interaction with smart devices through speech instructions has become an important function. To implement the function, the smart device stores a correspondence between keywords and speech instructions. When acquiring a speech signal, the smart device detects a keyword from the speech signal by detecting the speech signal, obtains a speech instruction corresponding to the detected keyword according to the correspondence between keywords and speech instructions, and further performs a corresponding operation based on the speech instruction, to improve user's operation experience. In the process of performing the operation based on the speech signal, the most important step is how to detect the keyword from the speech signal. Currently, during the detection of the keyword from the speech signal, the following two methods may be adopted in the related art.

The first method is mainly specific to an English usage scenario. According to the method, sub-words (e.g., prefix, suffix) in the speech signal are detected, when a sub-word whose pronunciation is the same as that of an English keyword is detected, posterior probabilities of the sub-words being the English keyword are accumulated in order, and a confidence that the speech signal includes the English keyword is finally obtained, the confidence being used for determining whether the keyword is detected. However, in a Chinese usage scenario, when the keyword includes a relatively large quantity of Chinese characters (key characters), a single-confidence detection manner is prone to a false detection. For example, if the keyword is "你好小听 (pronounced as ni3 hao3 xiao3 ting1 in Pinyin)", when the speech signal includes Chinese characters whose pronunciations are the same as those of any three key characters, for example, "你好小" or "你好听", a confidence obtained by accumulating posterior probabilities of the Chinese characters being the key characters may be relatively large, which is prone to a false detection.

According to the second method, the acquired speech signal is divided into at least two phonemes, a maximum posterior probability is obtained from posterior probabilities of at least two audio frames corresponding to each phoneme, and a confidence is obtained based on the maximum posterior probability, the confidence being also used for determining whether the keyword is detected. The method also adopts the single-confidence detection manner for decision-making, which is also prone to a false detection.

To improve the accuracy of a detection result, the embodiments of the present disclosure provide a method for detecting a keyword in a speech signal. According to the method, pronunciations of characters in an acquired speech signal are detected, target characters whose pronunciations are the same as those of key characters in a keyword is detected, posterior probabilities of the target characters being the key character in an acquisition time period of the speech signal are obtained, and the posterior probabilities of the target characters being the key characters in the acquisition time period of the speech signal are combined to obtain at least two confidences, so that whether the keyword is detected is determined according to the at least two confidences. According to the method, not only posterior probabilities of all target characters being the key characters in the acquisition time period of the speech signal are combined, but also posterior probabilities of some target characters being the key characters in the acquisition time period of the speech signal are combined, further at least two confidences are obtained according to an entire combination of the target characters and a partial combination of the target characters, and whether the keyword is detected is determined. For example, if the keyword is "你好小听" (pronounced as ni3 hao3 xiao3 ting1 in Pinyin)", after target characters whose pronunciations are the same as those of "你", "好", "小", and "听" are detected from the speech signal, target characters whose pronunciations are "你好小听", "你好", "你听", "好小", "小听", "你好小", and the like are combined, and when confidences of the various target character combinations all meet corresponding threshold conditions, it is determined that the keyword is detected, thereby reducing a false detection for the keyword.

Considering that in a Chinese usage scenario, there are a relatively large quantity of Chinese characters whose pronunciations are the same or similar, and in most scenarios, when a user speaks a keyword as a speech command, the volume of the keyword is obviously higher than the volume of environmental noise. Therefore, when the keyword includes a relatively small quantity of key characters, a signal-to-noise ratio of the speech signal may be calculated according to the embodiments of the present disclosure, and when the signal-to-noise ratio meets a corresponding threshold condition, it is determined that the keyword is detected, thereby reducing a false detection for the keyword, and improving the accuracy of the detection result.

The method for detecting a keyword in a speech signal provided in the embodiments of the present disclosure is mainly applied to a terminal, and the terminal may be a smart device such as a smartphone, a smart television, a smart sound, or a smart switch. The terminal is provided with an audio acquisition device such as a microphone or a microphone array, and the terminal may acquire a speech signal based on the audio acquisition device. The terminal is installed with an application or a control capable of performing speech control, and the speech control may be implemented based on the application or the control.

Figure 1:
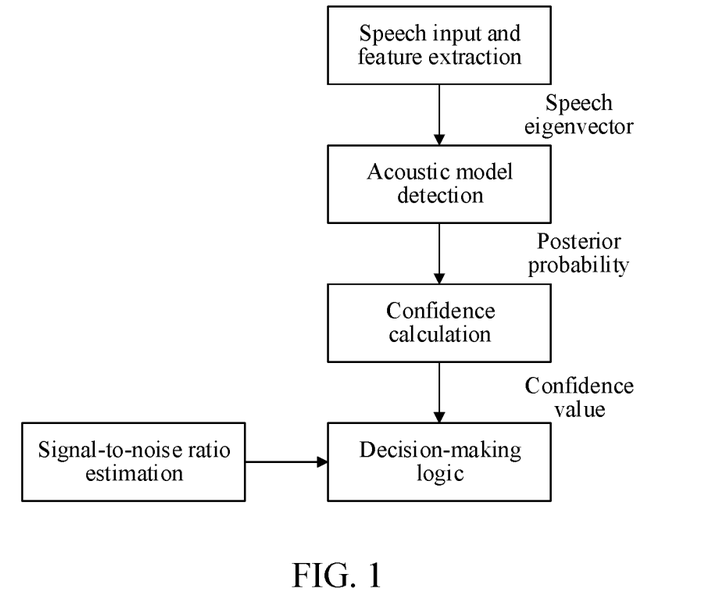
FIG. 1 is a diagram illustrating an implementation environment involved in a method for detecting a keyword in a speech signal according to an embodiment of the present disclosure.

FIG. 1 is a diagram of an implementation environment involved in a method for detecting a keyword in a speech signal, functional modules in the implementation environment being arranged in the terminal. Referring to FIG. 1, the functional modules include a speech input and feature extraction module, an acoustic model detection module, a confidence calculation module, a decision-making logic module, and a signal-to-noise ratio estimation module.

The speech input and feature extraction module includes a speech input submodule and a feature extraction submodule, the speech input submodule being configured to acquire a speech signal by using the audio acquisition devices such as the microphone or the microphone array, and the feature extraction submodule being configured to extract a speech eigenvector from the speech signal.

The acoustic model detection module is a pre-trained acoustic detection model, which includes but is not limited to, a generation model or a neural network constructed model based on a Gaussian mixture model (GMM)-hidden Markov model (HMM), a deep neural network (DNN), a convolutional neural network (CNN), a recurrent neural network (RNN), and the like. An input of the model is the speech eigenvector extracted by the speech input and feature extraction module, and an output thereof is posterior probabilities obtained through calculation by output nodes (including a key character output node and a non-key character output node).

The confidence calculation module is configured to calculate confidences of different key character combinations according to the posterior probabilities of the keywords outputted by the acoustic model detection module. For example, if the keyword is "你好小听 (pronounced as ni3 hao3 xiao3 ting1 in Pinyin)", confidences of a plurality of key character combinations, for example, "你好小听", "你好", "小听", "你好听", and "你好小", may be calculated.

The decision-making logic module is configured to compare at least two confidences obtained according to the confidence calculation module with a first specified threshold, and determine that the keyword is detected when the at least two confidences all meet a preset condition.

The signal-to-noise ratio estimation module is configured to calculate in real time energy of the environmental noise and the speech signal acquired by the audio acquisition device, calculate a signal-to-noise ratio of the speech signal according to the energy of the environmental noise and the energy of the speech signal, and input the calculated signal-to-noise ratio to the decision-making logic module to assist the decision-making logic module in decision-making. The function of the signal-to-noise ratio estimation module may be enabled or may not be enabled. When the function of the signal-to-noise ratio estimation module is enabled, the decision-making logic module may determine whether the signal-to-noise ratio of the speech signal meets a threshold condition, and when the signal-to-noise ratio of the speech signal meets the threshold condition, determine that the keyword is detected.

Figure 2:
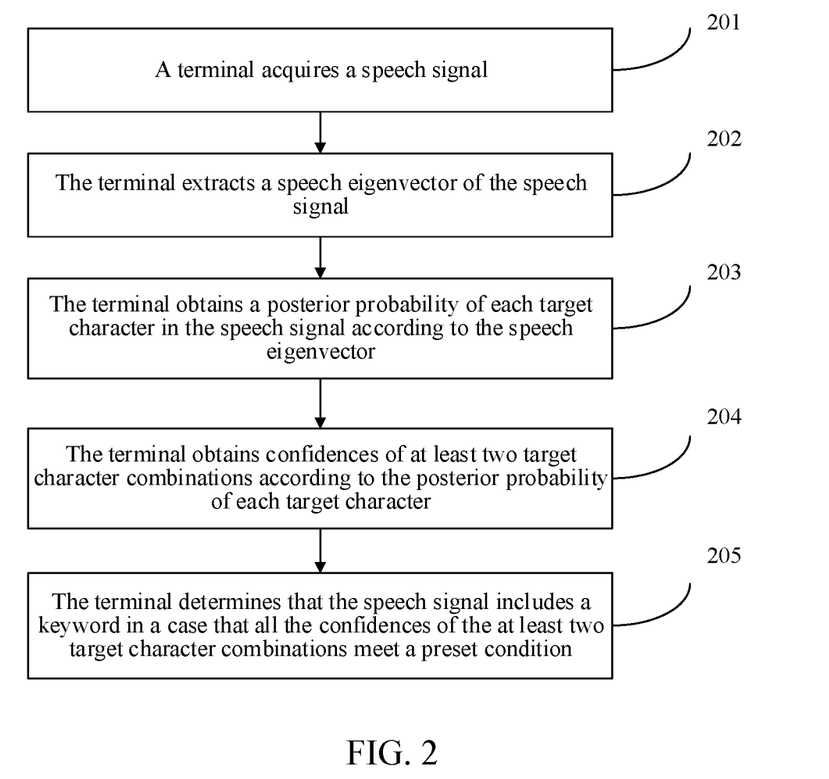
FIG. 2 is a flowchart of a method for detecting a keyword in a speech signal according to an embodiment of the present disclosure.

The embodiments of the present disclosure provide a method for detecting a keyword in a speech signal. Referring to FIG. 2, a process of the method provided by the embodiments of the present disclosure includes:

201. A terminal acquires a speech signal.

After a terminal is enabled, the terminal may acquire a speech signal of a user in real time through an audio acquisition device such as a microphone or a microphone array. The speech signal has a determined duration, which may be determined according to a pronunciation duration of the user. The speech signal is usually a speech digital signal.

202. The terminal extracts a speech eigenvector of the speech signal.

The speech eigenvector is a vector formed by voice features obtained based on hearing characteristics of human ears in the speech signal, the voice features that can be recognized by the human ears include a Mel-frequency cepstral coefficient, an Fbank feature, energy, and the like.

Specifically, when the terminal extracts the speech eigenvector of the speech signal from the acquired speech signal, the following steps may be adopted.

2021. The terminal divides the speech signal into at least two first speech segments, each first speech segment having the same duration.

The duration of the first speech segment may be 20 ms, 30 ms, or the like, and the duration of the first speech segment is not specifically limited in the embodiments of the present disclosure. For example, the duration is 20 ms, and the terminal may divide the speech signal by using 10 ms as a step, so as to obtain at least two first speech segments with a duration of 20 ms.

2022. The terminal extracts a speech feature from each first speech segment by using a preset feature extraction algorithm.

The preset feature extraction algorithm may be a Mel-frequency cepstral coefficient extraction algorithm, an Fbank feature extraction algorithm, or the like. The terminal may extract a corresponding speech feature from each first speech segment based on the preset feature extraction algorithm. For example, the terminal performs feature extraction on the first speech segment by using the Mel-frequency cepstral coefficient extraction algorithm to obtain a dynamic or static Mel-frequency cepstral coefficient; and the terminal performs feature extraction on the first speech segment by using the Fbank feature extraction algorithm to obtain an Fbank feature.

2023. The terminal combines (e.g., concatenates) the speech features of the at least two first speech segments to obtain the speech eigenvector.

The terminal performs feature extraction on the at least two first speech segments to obtain at least two speech features, and further combines, such as concatenates, the obtained at least two speech features to obtain the speech eigenvector. When combining the at least two speech features, the terminal may concatenate the at least two speech features in an acquisition time order. Alternatively, the terminal may combine the at least two speech features randomly. Certainly, other combining manners may also be adopted, and this is not specifically limited in the embodiments of the present disclosure.

For the extraction process of the speech eigenvector, reference may be made to the following specific examples.

The terminal acquires a speech digital signal of 16 KHz through the microphone, calculates static and dynamic Mel-frequency cepstral coefficients or Fbank features of each frame of speech data (that is, the first speech segment) through the speech input and feature extraction module in a speech digital signal processor or a central processing unit (CPU), and further combines features of one frame or a plurality of consecutive frames of speech data to obtain the speech eigenvector.

203. The terminal obtains a posterior probability of each target character in the speech signal according to the speech eigenvector.

In the embodiments of the present disclosure, each speech instruction executed by the terminal corresponds to one keyword, and each keyword includes at least two key characters. When extracting the speech eigenvector from the speech signal, the terminal inputs the speech eigenvector into the acoustic detection model, and the acoustic detection model outputs the posterior probability of each target character being the key character in the acquisition time period of the speech signal. The posterior probability is a posterior probability of the target character being a key character in any keyword in the acquisition time period of the speech signal. The target character is a character whose pronunciation matches that of the key character.

In the embodiments of the present disclosure, that the pronunciations are matched means that the pronunciations are the same or similar. For example, the key character "你" pronounces as "ni" in the first tone, for any character included in the speech signal, if the pronunciation of the character is "ni" in the first tone, "ni" in the second tone, or "ni" in the third tone, the character may be regarded as a character whose pronunciation matches that of the key character "你".

Characters whose pronunciations match those of two or more key characters cannot exist at the same time, and a posterior probability of a character being the key character at different moments is obtained. Finally, a posterior probability of each target character being the key character in the acquisition time period of the speech signal is obtained. The posterior probability in the acquisition time period of the speech signal is represented as a curve of the time and the posterior probability, and each point on the curve represents a posterior probability of the target character being the key character at a moment. In addition, the pronunciation of each character in the speech signal may only match that of one key character. Therefore, there is only one maximum probability point on the curve, that is, each target character only has one maximum posterior probability in the acquisition time period of the speech signal.

The acoustic detection model is used for detecting a character whose pronunciation matches that of the key character from the speech signal based on the speech eigenvector of the key character and obtaining a posterior probability of the character whose pronunciation matches that of the key character being the key character. The acoustic detection model may be obtained by training an initial acoustic detection model through the key character and the speech eigenvector thereof, and the initial acoustic detection model may be implemented through a probability generation module, or a neural network such as a DNN, a CNN, or an RNN, or a combination network thereof.

Figure 3:
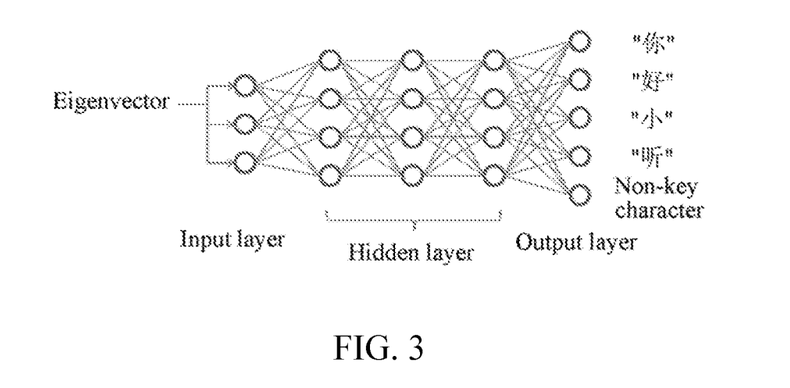
FIG. 3 is a schematic diagram of a network structure of an acoustic detection model according to an embodiment of the present disclosure.

FIG. 3 is an acoustic detection model obtained based on a neural network. Referring to FIG. 3, the acoustic detection model includes an input layer, a hidden layer, and an output layer, and the function of each layer is described as follows.

The input layer is used for inputting the speech eigenvector. The input layer has three nodes, but in fact, a quantity of nodes in the input layer is determined according to a quantity of values included in the inputted eigenvector. If the Fbank feature is adopted and Fbank features of two time segments are concatenated to be used as the input, and each time segment has 40 feature values, the input has 80 feature values. In this case, the quantity of nodes of the input layer is 80.

The hidden layer is used for processing the inputted speech eigenvector. FIG. 3 only shows that the hidden layer includes three network layers and each network layer includes four nodes, but in fact, a quantity of network layers in the hidden layer may be 1 to L. L is a positive integer greater than 1, usually between 1 to 200; a quantity K of nodes on each network layer is a positive integer greater than 1, usually between 2 to 2000, and a specific value of K may be determined according to a size of training data and a computing resource of the terminal.

The output layer includes P output nodes, which are P−1 key character output nodes and one non-key character output node respectively. The P−1 key character output nodes may output posterior probabilities of the target character in the speech signal being the P−1 key characters in the keyword in the acquisition time period of the speech signal; and the non-key character output node may output posterior probabilities of all non-key characters in the speech signal. For example, the keyword shown in FIG. 3 is "你好小听 (pronounced as ni3 hao3 xiao3 ting1 in Pinyin)", which includes four key characters, and the output layer has five nodes, where four nodes correspond to four key characters of "你", "好", "小", and "听" respectively, and one node corresponds to signal frames of all the non-key characters. The output layer performs a SoftMax operation on the posterior probabilities outputted by each node, and after the SoftMax operation, a sum of the posterior probabilities outputted by all the output nodes is 1. If a current frame belongs to a speech signal in a time period of a key character, a posterior probability outputted by an output node corresponding to the key character is close to 1, and a posterior probability outputted by the non-key character output node is close to 0.

204. The terminal obtains confidences of at least two target character combinations according to the posterior probability of each target character.

Each target character combination includes at least one target character, and a confidence of each target character combination is used for representing a probability of each target character combination being the keyword or a part of the keyword. In fact, the confidence includes a confidence obtained according to a posterior probability of each target character being the key character, and further includes a confidence obtained according to posterior probabilities of some target characters being the key character.

Specifically, when the terminal obtains the confidences of at least two target character combinations according to the posterior probability of each target character in the acquisition time period, the following steps may be adopted.

Step 1. The terminal randomly selects at least one target character by using different selectors according to the posterior probability of each target character, to obtain at least two target character combinations.

If the keyword includes N key characters, each key character combination may include M key characters, and the M key characters are randomly selected from the N key characters, so that $C_N^M$ combinations may be obtained. M and N are positive integers, and M is greater than or equal to 1 and less than or equal to N.

Figure 4:
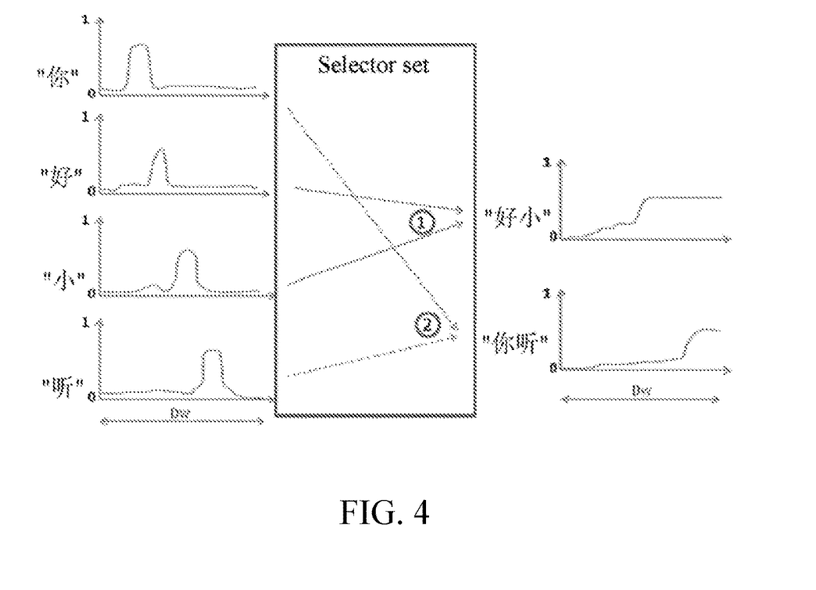
FIG. 4 is a schematic diagram of a confidence calculation process according to an embodiment of the present disclosure.

When the terminal randomly selects at least one target character for combination, the obtained target characters in each target character combination may be adjacent in time, or may not be adjacent in time. Referring to FIG. 4, the keyword is set to be "你好小听 (pronounced as ni3 hao3 xiao3 ting1 in Pinyin)", and the left column is a posterior probability of each target character in the speech signal outputted by the acoustic detection model being the key character in a time window Dw (that is, the acquisition time period of the speech signal), where the horizontal axis represents an acquisition time of the speech signal, and the vertical axis represents a probability value of the target character being the key character. Referring to the middle column in FIG. 4, a selector 1 in the terminal may combine target characters whose pronunciations are the same as those of two adjacent key characters of "好" and "小" into a part of the keyword, and a selector 2 may combine target characters whose pronunciations are the same as those of two non-adjacent key character of "你" and "听" into a part of the keyword.

Step 2. For any target character combination, the terminal obtains a maximum posterior probability of each target character according to the posterior probability of each target character in the target character combination in the acquisition time period.

Step 3. The terminal obtains a product of the maximum posterior probabilities of the target characters included in the target character combination to obtain a confidence of the target character combination.

Referring to FIG. 4, for the part of the keyword "好小" selected by the selector 1, the terminal multiplies the maximum posterior probabilities of the target characters whose pronunciations are the same as those of the two adjacent key characters of "好" and "小" in the time window Dw, to obtain a confidence of a target character combination whose pronunciation is "好小"; and the selector 2 multiplies the maximum posterior probabilities of the target characters whose pronunciations are the same as those of the two non-adjacent key characters of "你" and "听" in the time window Dw, to obtain a confidence of a target character combination whose pronunciation is "你听". Through the foregoing combinations, confidences on the right column in FIG. 4 may be obtained finally, where the horizontal axis represents a time of the speech signal, and the vertical axis represents confidences of different target character combinations.

In another implementation, the terminal may constrain a combination form of each target character combination according to acquisition time orders of different target characters, so that a confidence obtained by the target character combination obtained according to the acquisition time order is remarkably greater than a confidence of a target character combination obtained not according to the acquisition time order. For example, for the keyword "你好小听 (pronounced as ni3 hao3 xiao3 ting1 in Pinyin)", in different key character combinations obtained by combining the key characters by the terminal, a confidence of "你好" is greater than that of "好你". Based on the foregoing content, the terminal may obtain at least one target character according to the acquisition time order to obtain at least two target character combinations, obtain a maximum posterior probability of each target character according to the posterior probability of each target character in each target character combination in the acquisition time period, and further obtain a product of the maximum posterior probabilities of the target characters included in each target character combination to obtain a confidence of each target character combination.

To improve the accuracy of the obtained confidence, the terminal may perform smoothing on the posterior probability of each target character being the key character in the acquisition time period of the speech signal in a time domain, and further obtain a confidence based on the posterior probability after the smoothing.

205. The terminal determines that the speech signal includes a keyword in a case that all the confidences of the at least two target character combinations meet a preset condition.

After obtaining the confidences of the at least two target character combinations, the terminal compares the confidence of each target character combination with a first threshold, and when all the confidences of the at least two target character combinations are greater than the first threshold, the terminal determines that the speech signal includes the keyword. The preset condition may be the first threshold, the first threshold is determined according to an actual measurement result, and the first threshold may be 0.9, 0.95, or the like.

Certainly, in addition to comparing the confidence of each target character combination with the same first threshold, the terminal may further set a plurality of different first thresholds for different target character combinations. Therefore, when performing decision-making based on the confidences of the different target character combinations, the decision-making logic module may compare the confidence of each target character combination with a corresponding first threshold, and when the confidences of all the target character combinations are greater than the corresponding first thresholds, it is determined that the speech signal includes the keyword.

In another embodiment of the present disclosure, to improve the accuracy of the detection result, the terminal further estimates a signal-to-noise ratio of the speech signal, so as to further determine whether the speech signal includes the keyword according to the signal-to-noise ratio of the speech signal. Specifically, the process is as follows:

Step 1. The terminal obtains a second speech segment with a preset duration from the speech signal by using a moment at which it is determined that all the confidences of the at least two target character combinations meet the threshold condition as a start point.

The preset duration may be 200 ms, 300 ms, or the like. The preset duration is not specifically limited in the embodiments of the present disclosure.

The second speech segment includes at least one of a third speech segment and a fourth speech segment, that is, the second speech segment may be the third speech segment, or may be the fourth speech segment, or may be the third speech segment and the fourth speech segment. The third speech segment is a speech segment with a preset duration after the moment in the speech signal by using the moment as a start point; and the fourth speech segment is a speech segment with a preset duration before the moment in the speech signal by using the moment as an ending point.

Step 2. The terminal obtains the signal-to-noise ratio of the second speech segment.

When the terminal obtains the signal-to-noise ratio of the second speech segment, the following steps may be adopted.

(a). The terminal divides the second speech segment into at least two sub-segments, each sub-segment having the same duration.

During specific division, the terminal divides the second speech segment into a plurality of sub-segments by using a specific duration as a step. A duration of each sub-segment is the specific duration, and the sub-segments may overlap or not in time. The specific duration may be 20 ms or 30 ms.

(b). The terminal obtains an amplitude of a waveform signal corresponding to each sub-segment.

The terminal calculates an amplitude value of each sub-segment based on an envelope line of an amplitude absolute value of the waveform signal corresponding to each sub-segment, to obtain an amplitude of each sub-segment, the amplitude being a maximum amplitude value of each sub-segment.

(c). The terminal obtains a maximum amplitude and a minimum amplitude from the amplitudes corresponding to the at least two sub-segments.

The terminal compares the amplitudes of the at least two sub-segments based on the amplitudes of the at least two sub-segments, so as to obtain the maximum amplitude and the minimum amplitude from the amplitudes of the at least two sub-segments.

(d). The terminal obtains a logarithm ratio of the maximum amplitude to the minimum amplitude to obtain the signal-to-noise ratio of the second speech segment.

If the maximum amplitude is set to be S, and the minimum amplitude is set to be Q, the signal-to-noise ratio of the second speech segment is log(S/Q).

In addition to the foregoing method, the signal-to-noise ratio of the second speech segment may also be obtained by using a background estimation algorithm. According to the algorithm, environment background noise energy is tracked in real time, and the signal-to-noise ratio is calculated according to the energy of the speech signal and the energy of the environmental noise in the acquisition time period of the speech signal.

Step 3. The terminal determines that the speech signal includes the keyword in a case that the signal-to-noise ratio of the second speech segment meets the threshold condition.

A threshold of the threshold condition may be 2, 3, 5, or the like, and the threshold is not limited in the embodiments of the present disclosure. Because the second speech segment includes at least one of the third speech segment and the fourth speech segment, for different situations of the second speech segment, thresholds set by the terminal may also be different. In this way, when comparing the signal-to-noise ratio of the second speech segment with the threshold, the terminal may select a corresponding threshold for the speech segment included in the second speech segment, so as to compare the signal-to-noise ratio of the second speech segment with the corresponding threshold.

The foregoing keyword detection process based on the signal-to-noise ratio is described in detail with reference to FIG. 5.

Figure 5:
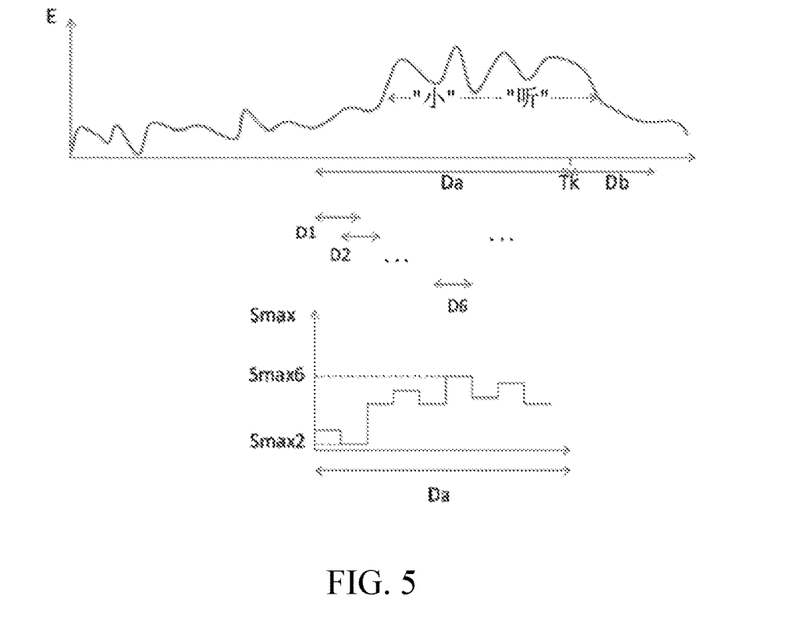
FIG. 5 is a schematic diagram of a signal-to-noise ratio calculation process according to an embodiment of the present disclosure.

Referring to FIG. 5, the horizontal axis in FIG. 5 represents an acquisition time of the speech signal, and the vertical axis represents an envelope line of an absolute value of energy or an amplitude. If the decision-making logic module determines that the keyword is detected at a moment Tk according to a confidence of each target character combination, the signal-to-noise ratio estimation module may obtain a fourth speech segment in a time period Da before the moment Tk, and obtain a signal-to-noise ratio of the fourth speech segment. When the signal-to-noise ratio of the fourth speech segment is greater than a set threshold THREHOLDa, it is determined that the speech signal includes the keyword, otherwise, the speech signal does not include the keyword. The decision-making logic module may further obtain a third speech segment in a time period Db after the moment Tk, and obtain a signal-to-noise ratio of the third speech segment. When the signal-to-noise ratio of the third speech segment is greater than a set second specified threshold THREHOLDb, it is determined that the speech signal includes the keyword, otherwise, it is determined that the speech signal does not include the keyword. Certainly, the signal-to-noise ratio estimation module may further determine that the speech signal includes the keyword in a case that the signal-to-noise ratio of the fourth speech segment is greater than the set threshold THREHOLDa and the signal-to-noise ratio of the third speech segment is greater than the set threshold THREHOLDb.

Referring to FIG. 5, an implementation process of signal-to-noise ratio estimation performed by the signal-to-noise ratio estimation module may be that: in the time period Da, envelope signals of amplitude absolute values in the time period Da are divided into a plurality of small segments of signals with an equal duration (for example, 300 ms) such as D1, D2, and the like, and the small segments of signals may overlap in time. An amplitude of each small segment of signal is calculated in the small segment of signal, the amplitude is a maximum amplitude value of the small segment of signal, and the amplitudes of the small signal segments are Smax1, Smax2, . . . , and Smaxn respectively. Next, the terminal calculates a maximum amplitude and a minimum amplitude in the entire time period Da, and calculates a logarithm ratio of the two to represent a signal-to-noise ratio of the speech signal in the time period Da approximately. For example, an amplitude obtained in a signal segment D2 is Smax2, and an amplitude obtained in a signal segment D6 is Smax6, where Smax2 is the minimum amplitude in the time period Da, and Smax6 is the maximum amplitude in the time period Da. The terminal calculates a logarithm value of a ratio of Smax6 to Smax2 to represent the signal-to-noise ratio approximately. A process of estimating a signal-to-noise ratio in the time period Db may be obtained by performing the same operation, and details are not described herein.

According to the method provided in the embodiments of the present disclosure, confidences of at least two target character combinations are obtained, and it is determined that a keyword is detected in a case that the confidences of all the target character combinations meet a threshold condition. Because the detection is performed based on a confidence obtained by combining posterior probabilities of target characters and confidences obtained by combining posterior probabilities of some target characters, a false detection can be avoided, and the detection result is more accurate.

In addition, when the keyword includes a relatively small quantity of key characters, the accuracy of the detection result is further ensured by performing a signal-to-noise ratio calculation on the speech signal and performing a verification according to the signal-to-noise ratio.

It is to be understood that, the steps of the embodiments of the present disclosure are not necessarily performed according to a sequence indicated by step numbers. Unless clearly specified in this specification, there is no strict sequence limitation on the execution of the steps, and the steps may be performed in another sequence. Moreover, at least some of the steps in each embodiment may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages of the another step.

In an embodiment, a terminal is further provided. The terminal includes an apparatus for detecting a keyword in a speech signal, the apparatus for detecting a keyword in a speech signal includes modules, and the modules may be all or partially implemented by using software, hardware, or a combination thereof.

Figure 6:
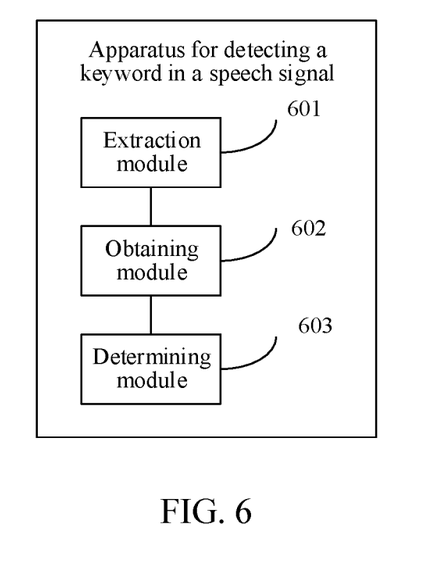
FIG. 6 is a schematic structural diagram of an apparatus for detecting a keyword in a speech signal according to an embodiment of the present disclosure.

Referring to FIG. 6, the embodiments of the present disclosure provide an apparatus for detecting a keyword in a speech signal, the apparatus including:

an extraction module 601, configured to extract a speech eigenvector of a speech signal;

an obtaining module 602, configured to obtain a posterior probability of each target character in the speech signal according to the speech eigenvector, the posterior probability being a posterior probability of the target character being a key character in any keyword in an acquisition time period of the speech signal, and the target character being a character whose pronunciation matches that of the key character, the obtaining module 602 being configured to obtain confidences of at least two target character combinations according to the posterior probability of each target character, each target character combination including at least one target character, and the confidence representing a probability of each target character combination being the keyword or a part of the keyword; and a determining module 603, configured to determine that the speech signal includes the keyword in a case that all the confidences of the at least two target character combinations meet a preset condition.

In another embodiment of the present disclosure, the extraction module 601 is configured to divide the speech signal into at least two first speech segments, each first speech segment having the same duration; extract a speech feature from the first speech segment by using a preset feature extraction algorithm; and combine the speech features of the at least two first speech segments to obtain the speech eigenvector.

In another embodiment of the present disclosure, the obtaining module 602 is configured to input the speech eigenvector into an acoustic detection model to output the posterior probability of each target character in the speech signal being the key character, where the acoustic detection model is used for detecting a character whose pronunciation matches that of the key character from the speech signal based on the speech eigenvector of the key character and obtaining a posterior probability of the character whose pronunciation matches that of the key character being the key character in the acquisition time period.

In another embodiment of the present disclosure, the obtaining module 602 is configured to obtain at least one target character according to an acquisition time order of each target character to obtain at least two target character combinations; obtain, for each target character combination, a maximum posterior probability of each target character according to the posterior probability of each target character in the target character combination in the acquisition time period; and obtain a product of the maximum posterior probabilities of the target characters included in the target character combination to obtain a confidence of the target character combination.

In another embodiment of the present disclosure, the obtaining module 602 is configured to obtain a second speech segment with a preset duration from the speech signal by using a moment at which it is determined that all the confidences of the at least two target character combinations meet the preset condition as a start point;

the obtaining module 602 is configured to obtain a signal-to-noise ratio of the second speech segment; and the determining module 603 is configured to determine that the speech signal includes the keyword in a case that the signal-to-noise ratio of the second speech segment meets a threshold condition.

In another embodiment of the present disclosure, the obtaining module 602 is configured to divide the second speech segment into at least two sub-segments, each sub-segment having the same duration; obtain an amplitude of a waveform signal corresponding to each sub-segment; obtain a maximum amplitude and a minimum amplitude from the amplitudes corresponding to the at least two sub-segments; and obtain a logarithm ratio of the maximum amplitude to the minimum amplitude to obtain the signal-to-noise ratio of the second speech segment.

In another embodiment of the present disclosure, the second speech segment includes at least one of a third speech segment and the fourth speech segment, the third speech segment being a speech segment with a preset duration after the moment in the speech signal by using the moment as a start point, and the fourth speech segment being a speech segment with a preset duration before the moment in the speech signal by using the moment as an ending point.

In conclusion, according to the apparatus provided in the embodiments of the present disclosure, confidences of at least two target character combinations are obtained, and it is determined that a speech signal includes a keyword in a case that the confidences of all the target character combinations meet a preset condition. Because the detection is performed based on a confidence obtained by combining posterior probabilities of target characters and confidences obtained by combining posterior probabilities of some target characters, a false detection can be avoided, and the detection result is more accurate.

In addition, when the keyword includes a relatively small quantity of key characters, the accuracy of the detection result is further ensured by performing a signal-to-noise ratio calculation on the speech signal and performing a verification according to the signal-to-noise ratio.

Figure 7:
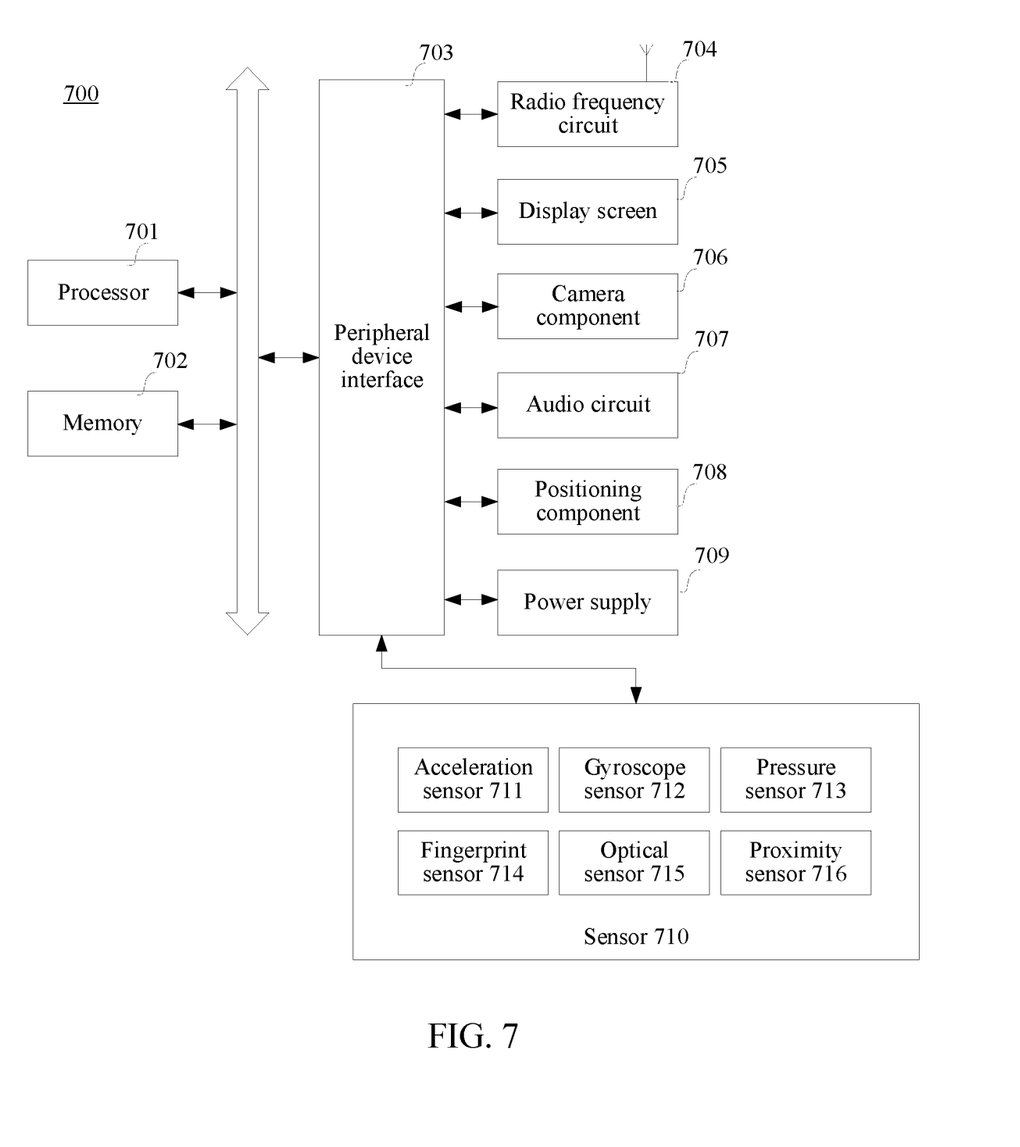
FIG. 7 is a structural block diagram of a terminal for detecting a keyword in a speech signal according to an exemplary embodiment of the present disclosure.

FIG. 7 is a structural block diagram of a terminal 700 for detecting a keyword in a speech signal according to an exemplary embodiment of the present disclosure. The terminal 700 may be a smartphone, a tablet computer, a moving picture experts group audio layer III (MP3) player, a moving picture experts group audio layer IV (MP4) player, a notebook computer, or a desktop computer. The terminal 700 may also be referred to as another name such as user equipment, a portable terminal, a laptop terminal, or a desktop terminal.

Generally, the terminal 700 includes a processor 701 and a memory 702.

The processor 701 includes one or more processing cores, for example, may be a 4-core processor or an 8-core processor. The processor 701 may be implemented in at least one hardware form of digital signal processing (DSP), a field-programmable gate array (FPGA), and a programmable logic array (PLA). The processor 701 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 701 may be integrated with a graphics processing unit (GPU). The GPU is configured to be responsible for rendering and drawing content that a display screen needs to display. In some embodiments, the processor 701 may further include an artificial intelligence (AI) processor. The AI processor is configured to process a computing operation related to machine learning.

The memory 702 may include one or more computer-readable storage media. The computer-readable storage medium may be non-transient. The memory 702 may further include a high-speed random access memory, and a non-volatile memory such as one or more magnetic disk storage devices and a flash storage device. In some embodiments, the non-transitory computer-readable storage medium in the memory 702 is configured to store at least one instruction, and the at least one instruction is configured to be executed by the processor 701 to implement the method for detecting a keyword in a speech signal provided in the embodiments of the present disclosure.

In some embodiments, the terminal 700 may alternatively include: a peripheral device interface 703 and at least one peripheral device. The processor 701, the memory 702 and the peripheral device interface 703 may be connected by a bus or a signal line. Each peripheral device may be connected to the peripheral device interface 703 through a bus, a signal cable, or a circuit board. Specifically, the peripheral device include: at least one of a radio frequency circuit 704, a display screen 705, a camera component 706, an audio circuit 707, a positioning component 708, and a power supply 709.

The peripheral device interface 703 may be configured to connect at least one peripheral related to input/output (I/O) to the processor 701 and the memory 702. In some embodiments, the processor 701, the memory 702, and the peripheral device interface 703 are integrated into the same chip or circuit board. In some other embodiments, any one or two of the processor 701, the memory 702, and the peripheral device interface 703 may be implemented on an independent chip or circuit board, and the implementation is not limited in this embodiment.

The radio frequency circuit 704 is configured to receive and transmit a radio frequency (RF) signal, which is also referred to as an electromagnetic signal. The RF circuit 704 communicates with a communications network and another communications device by using the electromagnetic signal. The RF circuit 704 converts an electrical signal into the electromagnetic signal to send, or converts a received electromagnetic signal into the electrical signal. Optionally, the RF circuit 704 includes an antenna system, an RF transceiver, one or more amplifiers, a tuner, an oscillator, a digital signal processor, a codec chip set, a subscriber identity module card, and the like. The RF circuit 704 may communicate with other terminals through at least one wireless communication protocol. The wireless communication protocol includes, but is not limited to: a metropolitan area network, generations of mobile communication networks (2G, 3G, 4G, and 5G), a wireless local area network and/or a Wi-Fi network. In some embodiments, the RF circuit 704 may also include a circuit related to near field communication (NFC). This is not limited in the present disclosure.

The display screen 705 is configured to display a user interface (UI). The UI may include a graphic, a text, an icon, a video, and any combination thereof. When the display screen 705 is a touch display screen, the display screen 705 also has the capability to collect a touch signal on or above a surface of the display screen 705. The touch signal may be inputted to the processor 701 for processing as a control signal. In this case, the display screen 705 may be further configured to provide a virtual button and/or a virtual keyboard, which is also referred to as a soft button and/or a soft keyboard. In some embodiments, there may be one display screen 705, disposed on a front panel of the terminal 700. In other some embodiments, there may be at least two display screens 705, disposed on different surfaces of the terminal 700 respectively or in a folded design. In still other embodiments, the display screen 705 may be a flexible display, disposed on a curved surface or a folded surface of the terminal 700. Even, the display screen 705 may be further set in a non-rectangular irregular pattern, namely, a special-shaped screen. The display screen 705 may be configured by using materials such as a liquid crystal display (LCD), an organic light-emitting diode (OLED), or the like.

The camera component 706 is configured to acquire an image or a video. Optionally, the camera component 706 includes a front-facing camera and a rear-facing camera. Generally, the front-facing camera is disposed on a front panel of the terminal, and the rear-facing camera is disposed on a back face of the terminal. In some embodiments, there are at least two rear-facing cameras, which are respectively any one of a main camera, a depth of field camera, a wide-angle camera, and a telephoto camera, so as to implement a background blurring function by fusing the main camera and the depth of field camera, and panoramic shooting and virtual reality (VR) shooting functions or other fusing shooting functions by fusing the main camera and the wide-angle camera. In some embodiments, the camera component 706 may further include a flash. The flash may be a monochrome temperature flash, or may be a double color temperature flash. The double color temperature flash refers to a combination of a warm flash and a cold flash, and may be configured to perform light ray compensation at different color temperatures.

The audio circuit 707 may include a microphone and a loudspeaker. The microphone is configured to collect a sound wave of a user and an environment, and convert the sound wave into the electrical signal to input to the processor 701 for processing, or to input to the RF circuit 704 for implementing voice communication. For stereo collection or noise reduction, there may be a plurality of microphones, disposed at different portions of the terminal 700 respectively. The microphone may be further a microphone array or an omnidirectional collection microphone. The loudspeaker is configured to convert the electrical signal from the processor 701 or the radio frequency circuit 704 into the sound wave. The loudspeaker may be a conventional film loudspeaker, or may be a piezoelectric ceramic loudspeaker. When the loudspeaker is the piezoelectric ceramic loudspeaker, electric signals not only can be converted into sound waves that can be heard by human, but also can be converted into sound waves that cannot be heard by human for ranging and the like. In some embodiments, the audio circuit 707 may also include an earphone jack.

The positioning component 708 is configured to position a current geographic location of the terminal 700 for implementing navigation or a location based service (LBS). The positioning component 708 may be a positioning component based on the Global Positioning System (GPS) of the United States, the BeiDou system of China, the GLONASS System of Russia, or the GALILEO System of the European Union.

The power supply 709 is configured to supply power for various components in the terminal 700. The power supply 709 may be an alternating current, a direct current, a disposable battery, or a rechargeable battery. When the power supply 709 includes the rechargeable battery, the rechargeable battery may be a wired rechargeable battery or a wireless rechargeable battery. The rechargeable battery may be further configured to support a fast charge technology.

In some embodiments, the terminal 700 may also include one or more sensors 710. The one or more sensors 710 include, but are not limited to: an acceleration sensor 711, a gyroscope sensor 712, a pressure sensor 713, a fingerprint sensor 714, an optical sensor 715, and a proximity sensor 716.

The acceleration sensor 711 may detect the magnitude of acceleration on three coordinate axes of a coordinate system established with the terminal 700. For example, the acceleration sensor 711 may be configured to detect a component of gravity acceleration on the three coordinate axes. The processor 701 may control, according to a gravity acceleration signal collected by the acceleration sensor 711, the display screen 705 to display the user interface in a transverse view or a longitudinal view. The acceleration sensor 711 may be further configured to collect game or user motion data.

The gyroscope sensor 712 may detect a body direction and a rotation angle of the terminal 700. The gyroscope sensor 712 may cooperate with the acceleration sensor 711 to collect a 3D action by the user on the terminal 700. The processor 701 may implement the following functions according to the data collected by the gyroscope sensor 712: motion sensing (such as changing the UI according to a tilt operation of the user), image stabilization at shooting, game control, and inertial navigation.

The pressure sensor 713 may be disposed at a side frame of the terminal 700 and/or a lower layer of the display screen 705. When the pressure sensor 713 is disposed on the side frame of the terminal 700, a holding signal of the user to the terminal 700 may be detected, and left/right hand identification and a quick action may be performed by the processor 701 according to the holding signal collected by the pressure sensor 713. When the pressure sensor 713 is disposed on the lower layer of the display screen 705, the processor 701 controls an operable control on the UI interface according to a pressure operation of the user on the display screen 705. The operable control includes at least one of a button control, a scroll-bar control, an icon control and a menu control.

The fingerprint sensor 714 is configured to collect a user's fingerprint, and the processor 701 identifies a user's identity according to the fingerprint collected by the fingerprint sensor 714, or the fingerprint sensor 714 identifies a user's identity according to the collected fingerprint. When identifying that the user's identity is a trusted identity, the processor 701 authorizes the user to perform related sensitive operations. The sensitive operations includes: unlocking a screen, viewing encryption information, downloading software, paying and changing a setting, and the like. The fingerprint sensor 714 may be disposed on a front surface, a back surface, or a side surface of the terminal 700. When a physical button or a vendor logo is disposed on the terminal 700, the fingerprint sensor 714 may be integrated with the physical button or the vendor logo.

The optical sensor 715 is configured to collect ambient light intensity. In an embodiment, the processor 701 may control the display brightness of the display screen 705 according to the ambient light intensity collected by the optical sensor 715. Specifically, when the ambient light intensity is relatively high, the display brightness of the display screen 705 is turned up. When the ambient light intensity is relatively low, the display brightness of the display screen 705 is turned down. In another embodiment, the processor 701 may further dynamically adjust a camera parameter of the camera component 706 according to the ambient light intensity collected by the optical sensor 715.

The proximity sensor 716, also referred to as a distance sensor, is generally disposed on the front panel of the terminal 700. The proximity sensor 716 is configured to collect a distance between the user and the front surface of the terminal 700. In an embodiment, when the proximity sensor 716 detects that the distance between the user and the front surface of the terminal 700 gradually becomes small, the display screen 705 is controlled by the processor 701 to switch from a bright screen state to an on-screen state. When the proximity sensor 716 detects that the distance between the user and the front surface of the terminal 700 gradually becomes large, the display screen 705 is controlled by the processor 701 to switch from the on-screen state to the bright screen state.

A person skilled in the art may understand that a structure shown in FIG. 7 constitutes no limitation on the terminal 700, and the terminal may include more or fewer components than those shown in the figure, or some components may be combined, or a different component deployment may be used.

According to the terminal provided in the embodiments of the present disclosure, confidences of at least two target character combinations are obtained, and it is determined that a speech signal includes a keyword in a case that the confidences of all the target character combinations meet a preset condition. Because the detection is performed based on a confidence obtained by combining posterior probabilities of target characters and confidences obtained by combining posterior probabilities of some target characters, a false detection can be avoided, and the detection result is more accurate.

In addition, when the keyword includes a relatively small quantity of key characters, the accuracy of the detection result is further ensured by performing a signal-to-noise ratio calculation on the speech signal and performing a verification according to the signal-to-noise ratio.

Figure 8:
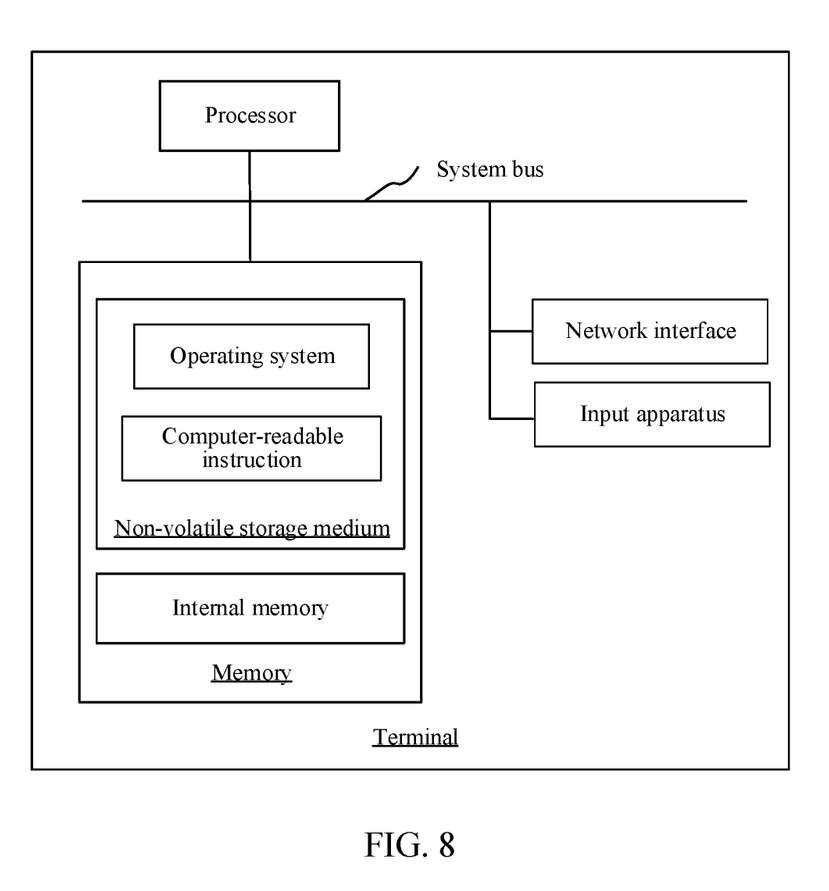
FIG. 8 is a diagram of an internal structure of a terminal according to an embodiment of the present disclosure.

FIG. 8 is a diagram of an internal structure of a terminal according to an embodiment. As shown in FIG. 8, the terminal includes a processor, a memory, a network interface, and an input apparatus that are connected through a system bus. The memory includes a non-volatile storage medium and an internal memory. The non-volatile storage medium of the terminal stores an operating system, and may further store a computer-readable instruction. The computer-readable instruction, when executed by the processor, may cause the processor to perform the method for detecting a keyword in a speech signal. The internal memory may also store a computer-readable instruction, and the computer-readable instruction, when executed by a processor, may cause the processor to perform the method for detecting a keyword in a speech signal. The input apparatus may be a touch layer covering the display, or may be a button, a trackball, or a touch panel disposed on a housing of the computer device, or may be an external keyboard, touch panel, or mouse.

A person skilled in the art may understand that, in the structure shown in FIG. 8, only a block diagram of a partial structure related to a solution in the present disclosure is shown, and does not constitute a limit to the terminal to which the solution in the present disclosure is applied. Specifically, the terminal may include more components or fewer components than those shown in the figure, or some components may be combined, or a different component deployment may be used.

In an embodiment, the apparatus for detecting a keyword in a speech signal provided in the present disclosure may be implemented in a form of a computer-readable instruction, and the computer-readable instruction may be run on the terminal shown in FIG. 8. The memory of the terminal may store program modules forming the apparatus for detecting a keyword in a speech signal, such as the extraction module 601, the obtaining module 602, and the determining module 603 shown in FIG. 6. A computer-readable instruction formed by the program modules causes the processor to perform the steps in the method for detecting a keyword in a speech signal in the embodiments of the present disclosure described in this specification.

The embodiments of the present disclosure provide a computer-readable storage medium, storing a computer-readable instruction, the computer-readable instruction being loaded and executed by a processor to implement the method for detecting a keyword in a speech signal shown in FIG. 2.

According to the computer-readable storage medium provided in the embodiments of the present disclosure, confidences of at least two target character combinations are obtained, and it is determined that a speech signal includes a keyword in a case that the confidences of all the target character combinations meet a preset condition. Because the detection is performed based on a confidence obtained by combining posterior probabilities of target characters and confidences obtained by combining posterior probabilities of some target characters, a false detection can be avoided, and the detection result is more accurate.

In addition, when the keyword includes a relatively small quantity of key characters, the accuracy of the detection result is further ensured by performing a signal-to-noise ratio calculation on the speech signal and performing a verification according to the signal-to-noise ratio.

When the apparatus for detecting a keyword in a speech signal provided in the foregoing embodiment detects a keyword in a speech signal, only divisions of the foregoing functional modules are described by using an example. During actual application, the foregoing functions may be allocated to and completed by different functional modules according to requirements, that is, the internal structure of the apparatus for a keyword in a speech signal is divided into different functional modules, to complete all or some of the foregoing described functions. In addition, the apparatus for detecting a keyword in a speech signal and embodiments of the method for detecting a keyword in a speech signal provided in the foregoing embodiments belong to one conception. For the specific implementation process, reference may be made to the method embodiments, and details are not described herein again.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a read-only memory (ROM), a magnetic disk, an optical disc, or the like.

The foregoing descriptions are merely exemplary embodiments of the present disclosure, and are not intended to limit the present disclosure. Any modification, equivalent replacement, improvement and the like made within the spirit and principle of the present disclosure shall fall within the protection scope of the present disclosure.

A person of ordinary skill in the art may understand that all or some of the processes of the methods in the foregoing embodiments may be implemented by a computer program instructing relevant hardware. The program may be stored in a non-volatile computer-readable storage medium. When the program is executed, the processes of the foregoing method embodiments are performed. Any reference to the memory, storage, a database, or other media used in the embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDRS-DRAM), an enhanced SDRAM (ESDRAM), a synchlink DRAM (SLDRAM), a Rambus direct RAM (RDRAM), a direct Rambus dynamic RAM (DRDRAM), and a Rambus dynamic RAM (RDRAM).

What is claimed is:

1. A method for detecting a keyword in a speech signal, applied to a terminal, comprising:

extracting a speech eigenvector of a speech signal;

obtaining, according to the speech eigenvector, a posterior probability of each of target characters being a key character in the keyword in an acquisition time period of the speech signal, the each of the target characters being a character in the speech signal whose pronunciation matches a pronunciation of the key character;

obtaining confidences of at least two target character combinations according to the posterior probability of the each target character, each of the at least two target character combinations including at least one target character, and the confidences of the at least two target character combinations each representing a probability of being the keyword or a part of the keyword, wherein the confidences of the at least two target character combinations are obtained by:

obtaining the at least two target character combinations by combining at least two of the target characters according to an acquisition time order of the each of the target characters;

obtaining a maximum posterior probability of the each of the target characters according to the posterior probability of the each of the target characters in the at least two target character combinations in the acquisition time period; and obtaining a product of the maximum posterior probabilities of the target characters comprised in the target character combination to obtain a confidence of the target character combination; and determining that the speech signal comprises the keyword upon determining that all the confidences of the at least two target character combinations meet a preset condition.

2. The method according to claim 1, wherein the extracting a speech eigenvector of a speech signal comprises:

dividing, by the terminal, the speech signal into at least two speech segments;

extracting, by the terminal, speech features from the at least two speech segments; and combining, by the terminal, the speech features of the at least two speech segments to obtain the speech eigenvector.

3. The method according to claim 1, wherein the obtaining a posterior probability of each target character comprises:

inputting, by the terminal, the speech eigenvector into an acoustic detection model to output the posterior probability.

4. The method according to claim 1, wherein the method further comprises:

obtaining, by the terminal, a second speech segment;

obtaining, by the terminal, a signal-to-noise ratio of the second speech segment; and determining, by the terminal, that the speech signal comprises the keyword upon determining that the signal-to-noise ratio of the second speech segment meets a threshold condition.

5. The method according to claim 4, wherein the obtaining, by the terminal, a signal-to-noise ratio of the second speech segment comprises:
dividing, by the terminal, the second speech segment into at least two sub-segments;
obtaining, by the terminal, an amplitude of a waveform signal of each of the at least two sub-segments;
obtaining, by the terminal, a maximum amplitude and a minimum amplitude from the amplitudes corresponding to the at least two sub-segments; and
obtaining, by the terminal, a logarithm ratio of the maximum amplitude to the minimum amplitude to obtain the signal-to-noise ratio of the second speech segment.

6. The method according to claim 4, wherein the second speech segment comprises at least one of a third speech segment or the fourth speech segment, the third speech segment being a speech segment with a preset duration after a moment in the speech signal and starts at the moment, and the fourth speech segment being a speech segment with a preset duration before the moment in the speech signal and ends the moment.

7. A terminal, comprising a memory and a processor, the memory storing computer-readable instructions, and the computer-readable instructions, when executed by the processor, causing the processor to perform:
extracting a speech eigenvector of a speech signal;
obtaining, according to the speech eigenvector, a posterior probability of each of target characters being a key character in the keyword in an acquisition time period of the speech signal, the each of the target characters being a character in the speech signal whose pronunciation matches a pronunciation of the key character;
obtaining confidences of at least two target character combinations according to the posterior probability of the each target character, each of the at least two target character combinations including at least one target character, and the confidences of the at least two target character combinations each representing a probability of being the keyword or a part of the keyword, wherein the confidences of the at least two target character combinations are obtained by:
obtaining the at least two target character combinations by combining at least two of the target characters according to an acquisition time order of the each of the target characters;
obtaining a maximum posterior probability of the each of the target characters according to the posterior probability of the each of the target characters in the at least two target character combinations in the acquisition time period; and
obtaining a product of the maximum posterior probabilities of the target characters comprised in the target character combination to obtain a confidence of the target character combination; and
determining that the speech signal comprises the keyword upon determining that all the confidences of the at least two target character combinations meet a preset condition.

8. The terminal according to claim 7, wherein the extracting a speech eigenvector of a speech signal:
dividing the speech signal into at least two first speech segments;
extracting speech features from the at least two speech segments; and
combining the speech features of the at least two speech segments to obtain the speech eigenvector.

9. The terminal according to claim 7, wherein the obtaining a posterior probability of each target characters in the speech signal according to the speech eigenvector comprises:
inputting the speech eigenvector into an acoustic detection model to output the posterior probability.

10. The terminal according to claim 7, wherein the computer-readable instruction further causes the processor to perform:
obtaining a second speech segment;
obtaining a signal-to-noise ratio of the second speech segment; and
determining that the speech signal comprises the keyword upon detecting that the signal-to-noise ratio of the second speech segment meets a threshold condition.

11. The terminal according to claim 10, wherein the obtaining a signal-to-noise ratio of the second speech segment comprises:
dividing the second speech segment into at least two sub-segments;
obtaining, an amplitude of a waveform signal of each of the at least two sub-segments;
obtaining a maximum amplitude and a minimum amplitude from the amplitudes corresponding to the at least two sub-segments; and obtaining a logarithm ratio of the maximum amplitude to the minimum amplitude to obtain the signal-to-noise ratio of the second speech segment.

12. The terminal according to claim 10, wherein the second speech segment comprises at least one of a third speech segment or the fourth speech segment, the third speech segment being a speech segment with a preset duration after a moment in the speech signal and starts at the moment, and the fourth speech segment being a speech segment with a preset duration before the moment in the speech signal and ends the moment.

13. One or more non-transitory storage media storing computer-readable instructions, the computer-readable instructions, when executed by one or more processors, causing the one or more processors to perform:
extracting a speech eigenvector of a speech signal;
obtaining, according to the speech eigenvector, a posterior probability of each of target characters being a key character in the keyword in an acquisition time period of the speech signal, the each of the target characters being a character in the speech signal whose pronunciation matches a pronunciation of the key character;
obtaining confidences of at least two target character combinations according to the posterior probability of the each target character, each of the at least two target character combinations including at least one target character, and the confidences of the at least two target character combinations each representing a probability of being the keyword or a part of the keyword, wherein the confidences of the at least two target character combinations are obtained by:
obtaining the at least two target character combinations by combining at least two of the target characters according to an acquisition time order of the each of the target characters;
obtaining a maximum posterior probability of the each of the target characters according to the posterior probability of the each of the target characters in the at least two target character combinations in the acquisition time period; and obtaining a product of the maximum posterior probabilities of the target characters comprised in the target character combination to obtain a confidence of the target character combination; and determining that the speech signal comprises the keyword upon determining that all the confidences of the at least two target character combinations meet a preset condition.

14. The storage medium according to claim 13, wherein the extracting a speech eigenvector of a speech signal comprises:

dividing the speech signal into at least two speech segments;

extracting speech features from the at least two speech segments; and combining the speech features of the at least two speech segments to obtain the speech eigenvector.

15. The storage medium according to claim 13, wherein the obtaining a posterior probability of each target character in the speech signal according to the speech eigenvector comprises:

inputting the speech eigenvector into an acoustic detection model to output the posterior probability.

16. The storage medium according to claim 13, wherein the computer-readable instructions further cause the processor to perform:

obtaining a second speech segment;

obtaining a signal-to-noise ratio of the second speech segment; and determining that the speech signal comprises the keyword upon determining that the signal-to-noise ratio of the second speech segment meets a threshold condition.

17. The storage medium according to claim 16, wherein the obtaining a signal-to-noise ratio of the second speech segment comprises:

dividing the second speech segment into at least two sub-segments;

obtaining an amplitude of a waveform signal of each of the at least two sub-segments;

obtaining a maximum amplitude and a minimum amplitude from the amplitudes corresponding to the at least two sub-segments; and obtaining a logarithm ratio of the maximum amplitude to the minimum amplitude to obtain the signal-to-noise ratio of the second speech segment.

* * * * *